(12) United States Patent
Cavalcanti (10) Patent No.: US 7,260,208 B2
(45) Date of Patent: Aug. 21, 2007

(54) SYSTEM, METHOD AND APPARATUS FOR LEAST COST AUTOMATIC ROUTING OF CALLS IN TELEPHONE NETWORKS WITH DATA SUPPLIED ON DEMAND

(76) Inventor: Roberto Faria Cavalcanti, Al. Dr. Jose Maniero 351, Jaragua, 02997-200, Sao Paulo-SP (BR)

( * ) Notice: Subject to any disclaimer, the term of this patent is extended or adjusted under 35 U.S.C. 154(b) by 0 days.

(21) Appl. No.: 10/499,779

(22) PCT Filed: Dec. 19, 2002

(86) PCT No.: PCT/BR02/00191

§ 371 (c)(1),
(2), (4) Date: Dec. 2, 2004

(87) PCT Pub. No.: WO03/056801

PCT Pub. Date: Jul. 10, 2003

(65) Prior Publication Data

US 2005/0078814 A1    Apr. 14, 2005

(30) Foreign Application Priority Data

Dec. 21, 2001  (BR) ............................... 8103297 U (51) Int. Cl.
*H04M 7/00*    (2006.01)
*H04M 15/00*    (2006.01)
(52) U.S. Cl. .............................. 379/221.01; 379/114.02
(58) Field of Classification Search .......... 379/221.01, 379/221.02, 219, 220.01, 114.02, 114.06, 379/114.09
See application file for complete search history.

(56) References Cited

U.S. PATENT DOCUMENTS 5,862,203 A * 1/1999 Wulkan et al. ......... 379/114.02
6,748,064 B2 * 6/2004 Zbib ..................... 379/114.02

FOREIGN PATENT DOCUMENTS

| EP | 0 898 430 A1 | 2/1999 |
| GB | 2 328 117 A | 7/1998 |
| WO | WO 00/41486 | 7/2000 |

\* cited by examiner

*Primary Examiner*—Benny Quoc Tieu
(74) *Attorney, Agent, or Firm*—TraskBritt, P.C.

(57) ABSTRACT

A system to be used in fixed and mobile telephone networks, based on telephone set types (1), (3) and (8) that have the capacity of storing in a memory (21) a number of carrier identification codes organized in table form (36) and of performing the automatic selection of the least cost carrier to route a call initiated by the user. Such telephone sets also capable of connecting periodically and automatically to an information provider (6) that contains a users database (9) and a tariffs database (10), both permanently updated, for the purpose of keeping updated the information stored in memory (21). All the processing to determinate the least cost route is performed at the information provider (6) and information is sent to the user's telephone set (1), (3) and (8) on demand.

5 Claims, 9 Drawing Sheets

| HOUR | DAY OF THE WEEK | | | 36 |
|---|---|---|---|---|
| | 1 | 2 | 3 | |
| 1 | CICn | CICn | CICn | |
| 2 | CICn | CICn | CICn | |
| 3 | CICn | CICn | CICn | |
| 4 | CICn | CICn | CICn | |
| 5 | CICn | CICn | CICn | |
| 6 | CICn | CICn | CICn | |
| 7 | CICn | CICn | CICn | |
| 8 | CICn | CICn | CICn | |
| 9 | CICn | CICn | CICn | |
| 10 | CICn | CICn | CICn | |
| 11 | CICn | CICn | CICn | |
| 12 | CICn | CICn | CICn | |
| 13 | CICn | CICn | CICn | |
| 14 | CICn | CICn | CICn | |
| 15 | CICn | CICn | CICn | |
| 16 | CICn | CICn | CICn | |
| 17 | CICn | CICn | CICn | |
| 18 | CICn | CICn | CICn | |
| 19 | CICn | CICn | CICn | |
| 20 | CICn | CICn | CICn | |
| 21 | CICn | CICn | CICn | |
| 22 | CICn | CICn | CICn | |
| 23 | CICn | CICn | CICn | |
| 24 | CICn | CICn | CICn | |

SYSTEM, METHOD AND APPARATUS FOR LEAST COST AUTOMATIC ROUTING OF CALLS IN TELEPHONE NETWORKS WITH DATA SUPPLIED ON DEMAND

The present invention relates to a system, method and apparatus that allow the automatic routing of calls in telephone networks aiming to ease operation and reduce costs in long distance national or international calls for the user.

DESCRIPTION OF THE PRIOR ART

The routing is automatically done by the user apparatus based on information supplied on demand by an information provider through the telephone network.

Automatic routers of previous art, among which the following US patents are highlighted: U.S. Pat. No. 6,141,411; US 6,078,652; US 5,881,139; US 5,878,122; US 5,862,203; US 5,638,433; US 5,519,769; US 5,425,085; US 5,425,084 and US 4,791,665, define in their majority a system composed of: an apparatus associated to the user's telephone set, capable of storing long distance carriers tariffs; an information provider accountable for updating the tariffs at the user's apparatus. Those systems differ on the type of information stored at the user's apparatus, on the forms and means of communicating the user's apparatus with the information provider, on the way how least cost routing is done, some are applicable only to PABX systems and some are suitable to specific charging schemes.

Previous art systems are difficult to be implemented in practice either because they need a great volume of information to be stored at the user's apparatus making it difficult to be implemented as a simple equipment and demanding a high frequency of information updates or because they are limited regarding the types of user's communication equipment or in respect the charging schemes they can deal with.

The problems described above make those systems not transparent either for the user nor for the telephone network, that means their implementation cause physical and or functional changes for the user or to the telephone network.

Bearing those problems in mind and willing to overcome them, was developed the system, method and apparatus for least cost automatic routing of calls in telephone networks with data supplied on demand, object of the present invention, comprising an information provider connected to the telephone network, that contains a long distance carrier tariffs database and a system users database, a user's telephone apparatus capable of storing carrier identification codes (CIC) in table form, such tables containing the long distance carriers CICs with the lowest possible cost for the user demanded calls, and a system's operation method that consists of: concentrating all the processing needed to achieve the least cost routing at the information provider which will create and maintain in its database all the tables needed for each user; sending on demand for each user its specific tables and their updates; performing at the users' telephone apparatus whenever they initiate a long distance call avoiding to dial the CIC, the automatic insertion of the lowest cost carrier CIC in the signalling transmitted to the telephone line for the desired call.

Being a system that works on demand, the user's apparatus receives only the specific information needed by the user thus reducing the memory required for its storage.

BRIEF DESCRIPTION OF THE DRAWINGS

The present invention will now be described in greater detail with reference to one of the embodiments represented in the figures, in which FIG. 1—is a diagram that illustrates the system's constitution for fixed or mobile telephone networks, object of this invention.

DETAILED DESCRIPTION OF THE DRAWINGS

Figure 1:
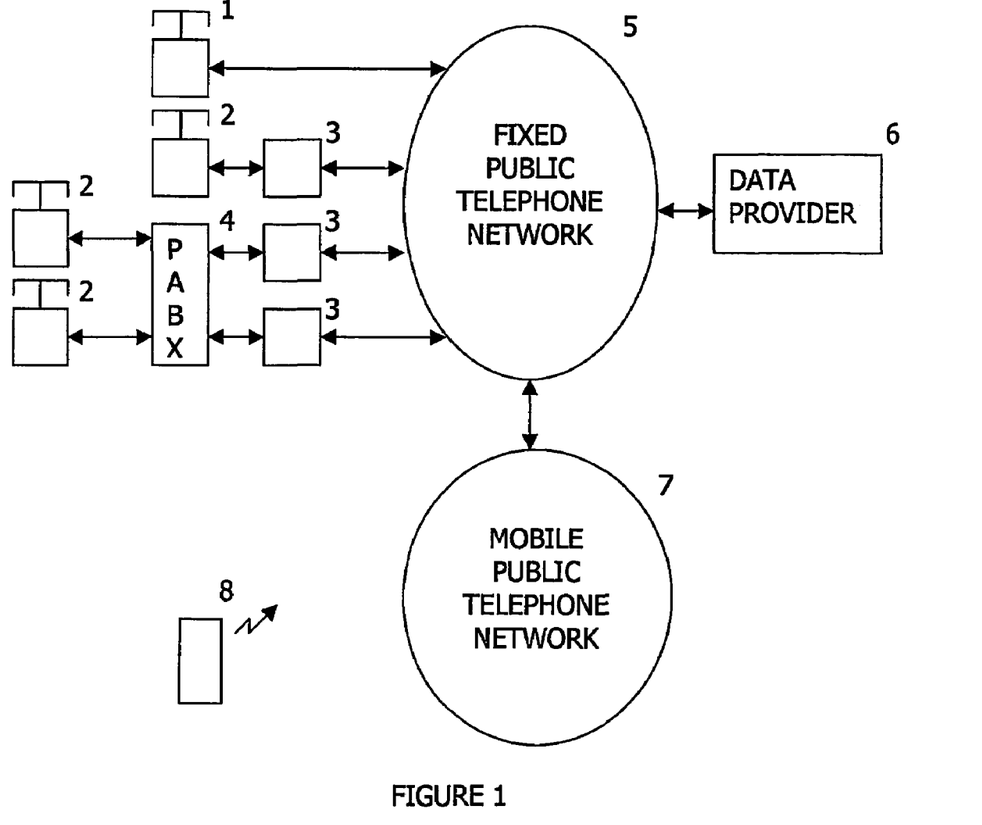

According to a preferred embodiment and as can be seen from FIG. 1 the model of system, method and apparatus for least cost automatic routing of calls in telephone networks with data supplied on demand, object of the present invention comprises an information provider 6 connected to the telephone network 5, an user's fixed telephone set 1 connected to the telephone network 5 and an user's interface 3 which is used when the user's communication equipment is a PABX 4 or a common telephone set 2 that the user does not want to change by a fixed telephone set 1. User's interface 3 is also used when instead of a common telephone set 2, the user has a fax machine or a microcomputer or any other equipment that communicate through the telephone network.

The same system applies to mobile telephone networks 7 where a user's mobile telephone set 8 can communicate with information provider 6.

Information provider 6 is shown connected to the fixed telephone network 5 just to ease the understanding, but it could also be connected to the mobile telephone network 7, or there should be more than one information providers 6 connected to each network as required.

Figure 3:
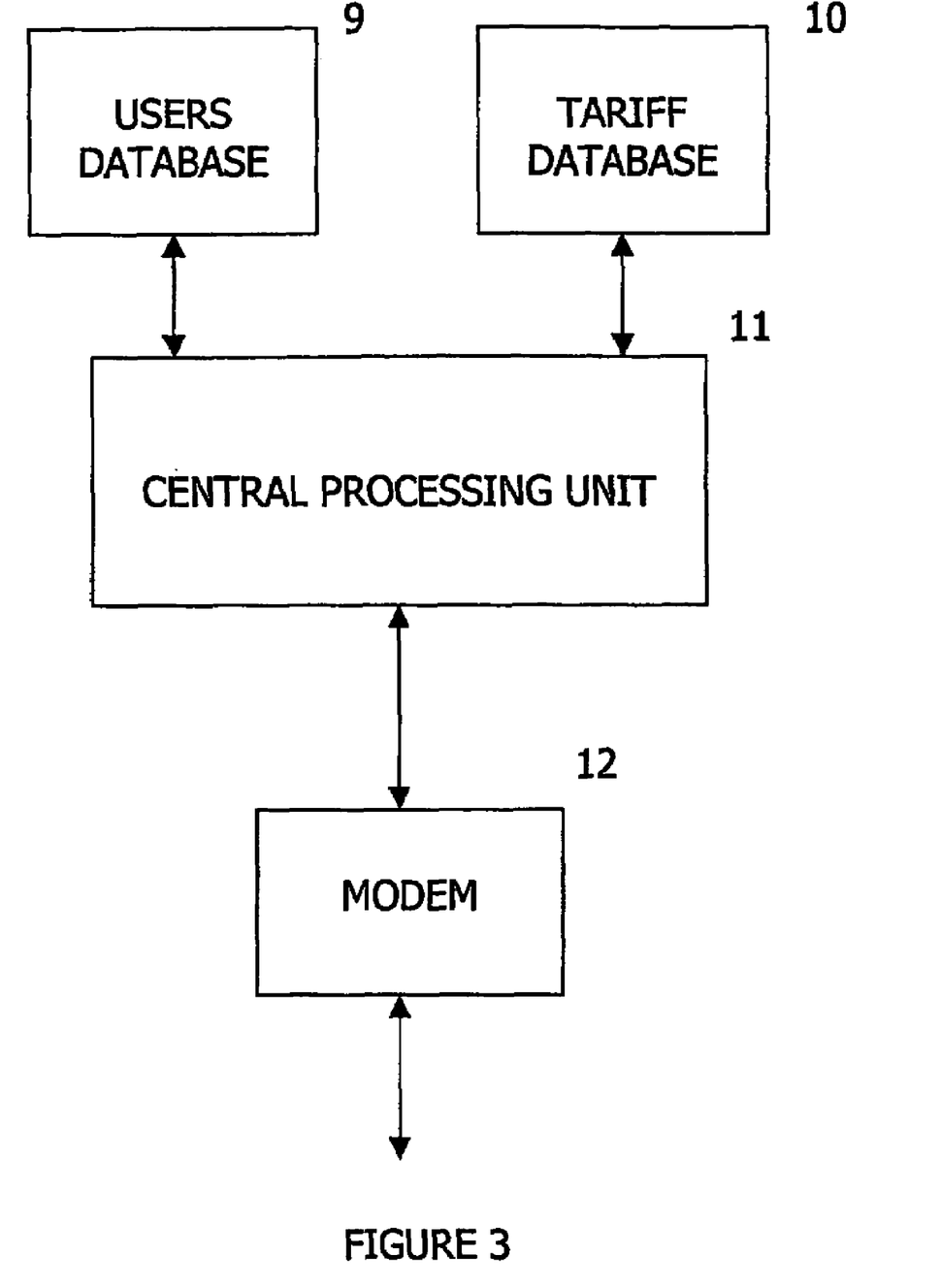
FIG. 3—is a diagram that illustrates the constitution of the information provider, object of this invention.

Information provider 6 is detailed in FIG. 3, comprising a central processing unit (CPU) 11 that controls a tariffs database 10, a users database 9 and one or more modems 12.

Tariffs database 10 contains tariff information of all long distance carrier companies operating in the country, such information is kept constantly updated.

Figure 2:
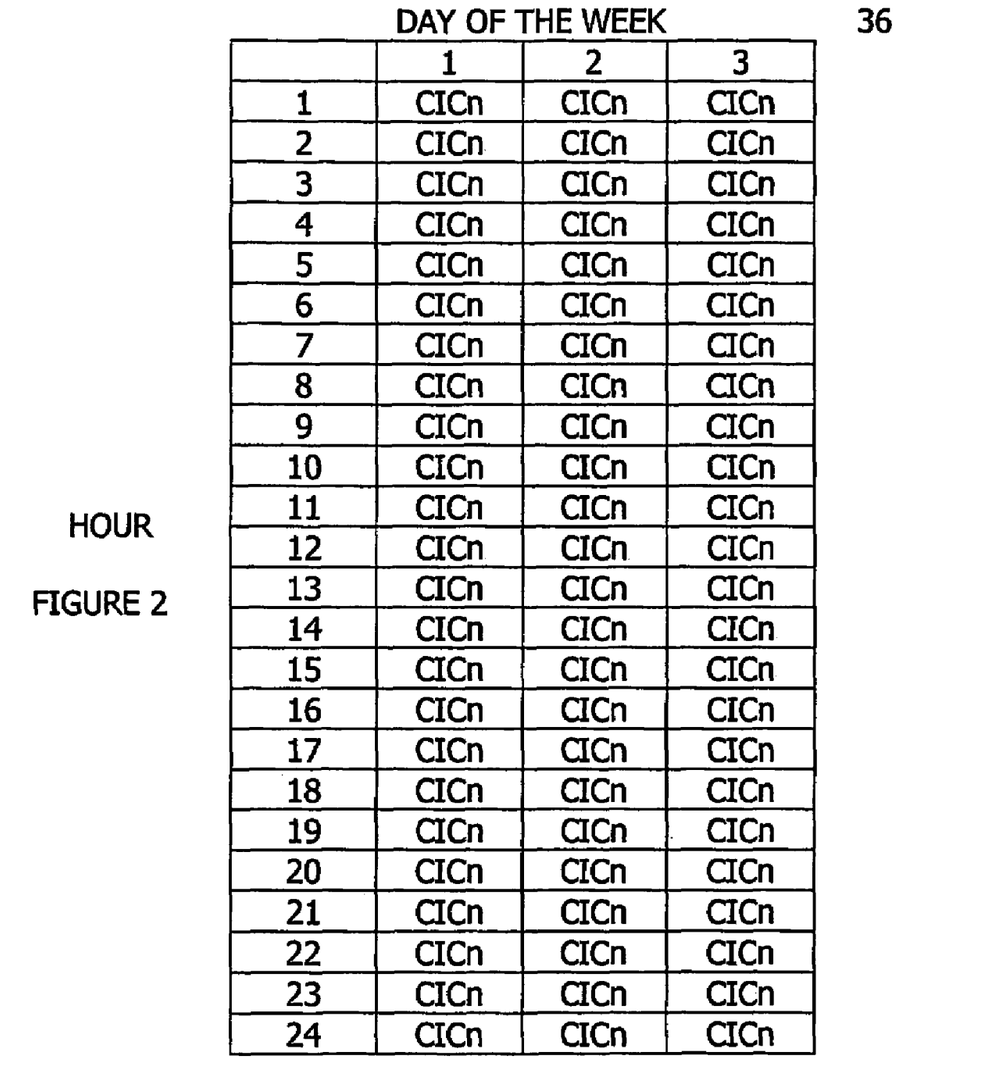
FIG. 2—is a diagram that illustrates an example of a least cost carrier table, object of this invention.

Users database 9 contains information allowing to identify the users, their preferences on the use of long distance services, including the origin-destination pairs of their calls, their daily and weekly call preferences, their affiliation to carrier's optional calling plans and other information, that will allow central processing unit 11 to execute algorithms on data of tariffs database 10, that create for each origin-destination pair selected by the user, a table as the one shown on FIG. 2, containing in a consolidated way for each day of the week the lowest cost carrier CIC in hourly basis. Users database 9 also stores the tables related to all origin-destination pairs selected by the users, being updated whenever an update is performed on tariffs database 10.

Modem 12 is used to communicate with users telephone sets 1 and 8 or with user's interface 3, via the telephone network, to update the tables stored at their memories and for information exchange necessary to the system's operation.

The use of tables like the one of FIG. 2, where information is qualitative and not quantitative leads to the reduction of the amount of information to be stored at the user's telephone sets 1 and 8 and at the user's interface 3, because many origin-destination pairs may have the same table, it also reduces the need for processing capacity in these terminals because all the processing to determine the least cost carriers is performed at information provider 6, it also minimizes the needs for communication between information provider 6 and apparatus 1, 3 and 8 for update purposes because information is qualitative.

Figure 4:
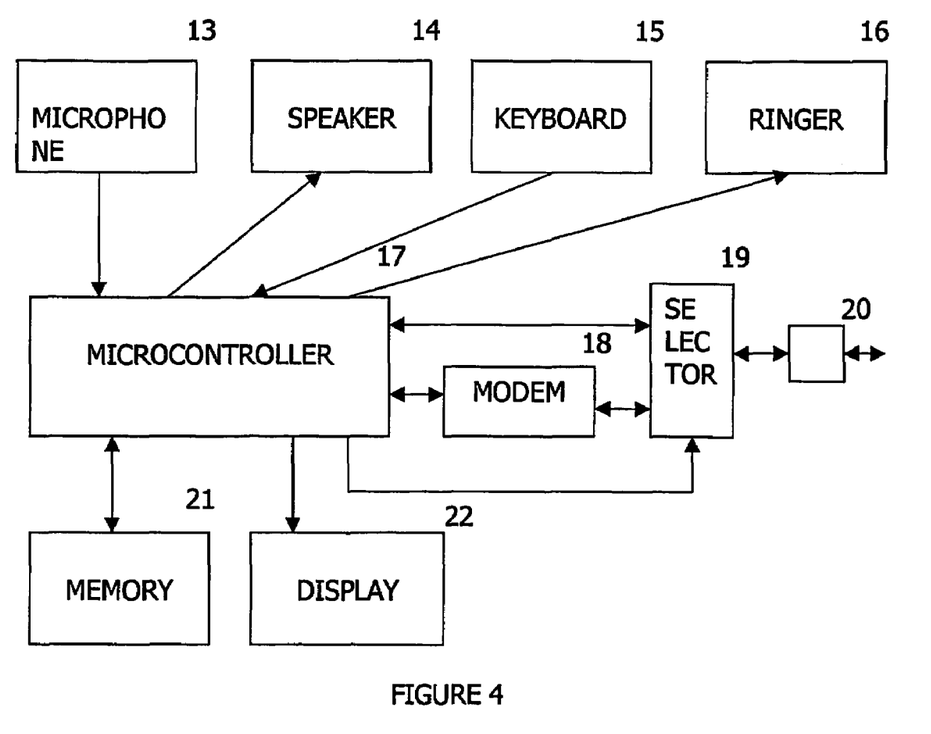
FIG. 4—is a diagram that illustrates the constitution of the user's fixed telephone set for fixed telephone networks, object of this invention.

As can be seen in FIG. 4, the user's fixed telephone set 1 comprises: a microphone 13, a speaker 14, a keyboard 15, a ringer 16, a micro controller 17, a modem 18, a selector 19, a digital memory 21, a display 22 and a connector 20 for the telephone line. Micro controller 17 has circuitry and software that allows it to control the other blocks to perform the functions of a common fixed telephone set when receiving calls and making local calls. When the user is to make a long distance call avoiding to dial the CIC, micro controller 17 analyses the digits dialled by the user, identifies the call destination and performs the operations described in FIG. 7, as will be discussed further, after what the apparatus returns to work as a common fixed telephone set.

Periodically at intervals defined by information provider 6, micro controller 17 will switch selector 19 to connect the telephone line to modem 18, allowing its communication with information provider 6 to update the tables stored in memory 21, performing the operations described in FIG. 8, as will be discussed further. Ended the update micro controller 17 switches back selector 19 to its normal position disconnecting modem 18 from the telephone line and returning to its normal operation.

Figure 5:
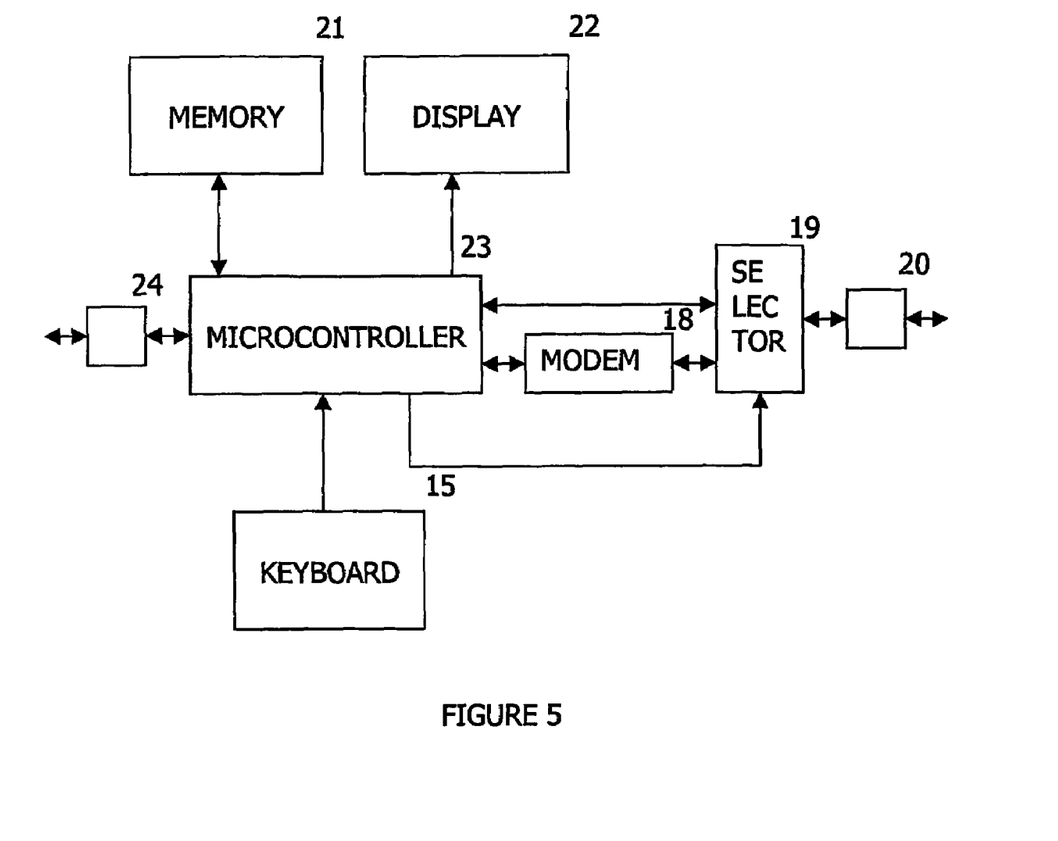
FIG. 5—is a diagram that illustrates the constitution of the user's interface which is used to implement the system's functions for fax machines, PABXs, microcomputers or when the user does not want to change its telephone set, object of this invention.

As can be seen in FIG. 5, an user's interface 3 comprising a memory 21, a display 22, a micro controller 23, a keyboard 15, a modem 18, a selector 19, a connector 20 for the telephone line and a connector 24 for connecting a PABX trunk line or a common telephone set, or a fax machine, or a microcomputer or any other equipment that communicates through the fixed telephone network. Micro controller 23 has circuitry and software that allow it to: detect an incoming call from the telephone line through connector 20 and transfer it for the user's equipment through connector 24; analyze the signaling coming from user's equipment through connector 24 and identify the call category, for local calls all the signaling is transferred to the telephone line through connector 20, for long distance calls that must be made without dialing the CIC on the user's equipment, micro controller 23 identifies the call destination and performs the operations described in FIG. 7, as will be discussed further, after what micro controller 23 maintains a straight connection between connectors 20 and 24 until the user or the called party terminate the call, at that moment the connection is broken and the normal idle conditions are established for both connectors 20 and 24.

Periodically at intervals defined by information provider 6 micro controller 23 will switch selector 19 to connect the telephone line to modem 18, allowing its communication with information provider 6 to update the tables stored in memory 21, performing the operations described in FIG. 8, as will be discussed further. Ended the update micro controller 23 switches back selector 19 to its normal position disconnecting modem 18 from the telephone line and returning to the normal operation.

Figure 6:
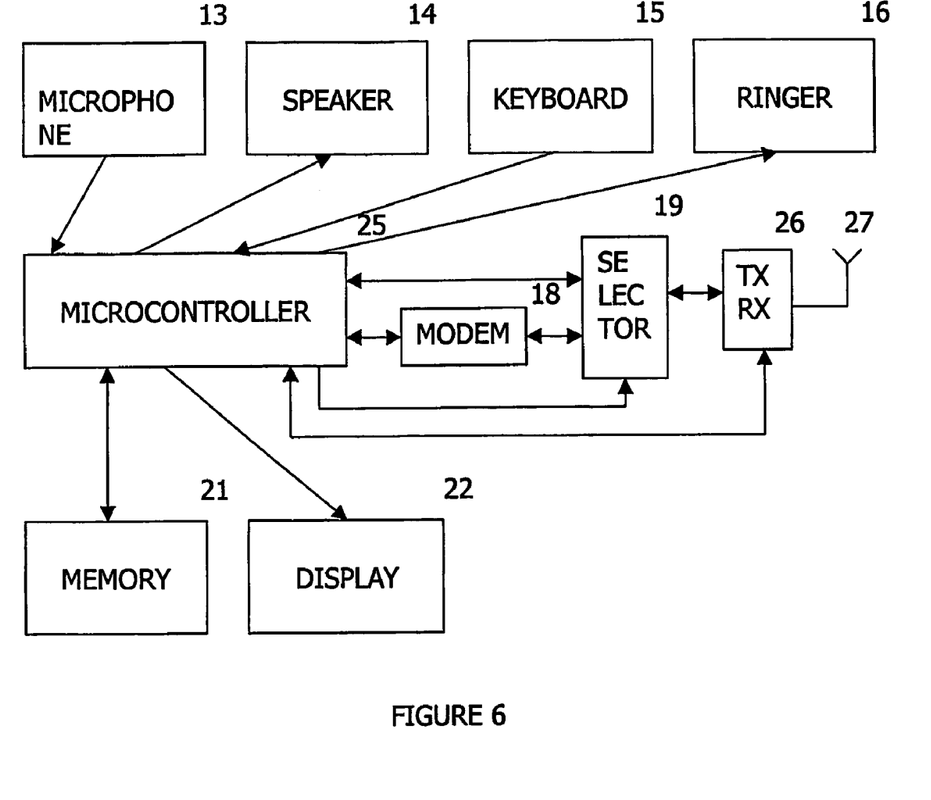
FIG. 6—is a diagram that illustrates the constitution of the user's mobile telephone set for mobile telephone networks, object of this invention.

According to what is illustrated in FIG. 6, user's mobile telephone set 8 is constituted by a microphone 13, a speaker 14, a keyboard 15, a ringer 16, a micro controller 25, a modem 18, a selector 19, a memory 21, a display 22, a transmitter and receiver block 26 and an antenna 27. The transmitter and receiver block 26 performs all the functions related to transmitting and receiving voice and specific signaling for mobile networks, according to each mobile cellular network technology.

Micro controller 25 has circuitry and software that allows it to control the other blocks performing the functions of a common mobile telephone set in respect to receiving calls and making local calls. When the user is to make a long distance call avoiding to dial the CIC, micro controller 25 analyses the digits dialed by the user, identifies the call destination and performs the operations described in FIG. 7, as will be discussed further, after what the apparatus returns to work as a common mobile telephone set.

Periodically at intervals defined by information provider 6, micro controller 25 will switch selector 19 to connect transmitter and receiver block 26 to modem 18, allowing its communication with information provider 6 to update the tables stored in memory 21, performing the operations described in FIG. 8, as will be discussed further. Ended the update micro controller 25 switches back selector 19 to its normal position, disconnecting modem 18 from transmitter and receiver block 26 and returning to the normal operation.

Figure 7:
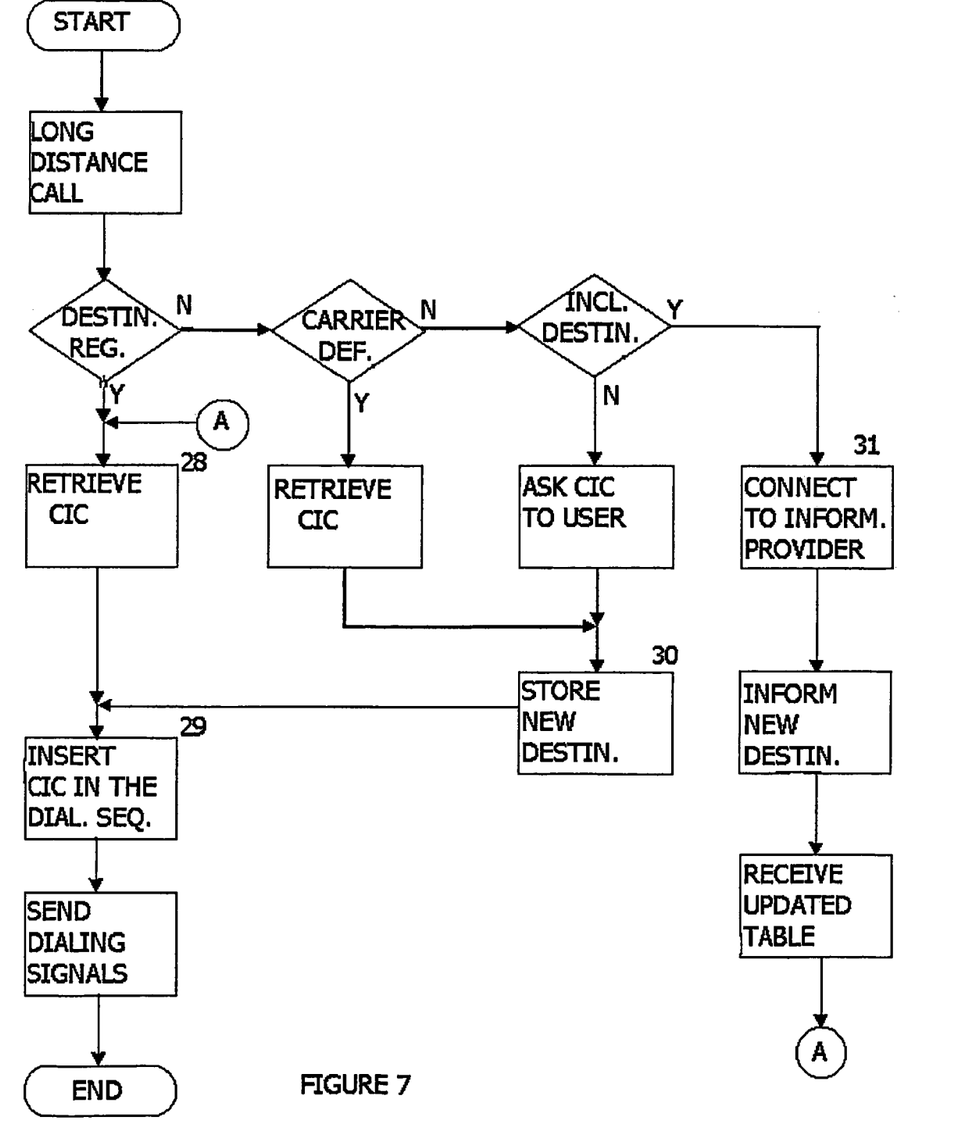
FIG. 7—is a diagram that illustrates the operation of the user's fixed or mobile telephone sets and of the user's interface, during the establishment of a long distance call, object of this invention.

According to FIG. 7 the operations flow chart of user's fixed telephone set 1 and mobile set 8 and of user's interface 3 during a long distance call.

After identifying the call destination micro controllers 17, 23 and 25 verify if memory 21 contains a table associated to that destination, if positive in step 28 the destination, present date and present time information are used to locate in the relevant table, stored in memory 21, the CIC of the appropriated carrier, further in step 29, the digits of the recovered CIC are inserted in the adequate position of the sequence dialed by the user and the resulting signaling is transmitted through selector 19 and connector 20 to the telephone line or via selector 19, transmitter and receiver block 26 and antenna 27 when the apparatus is the mobile telephone set 8. If the call has a destination not previously used, micro controllers 17, 23 and 25 consult memory 21 to find out if the user has defined a specific carrier for this situation, if positive they retrieve the carrier CIC and follow to step 30. If the user has not defined a specific carrier, micro controllers 17, 23 and 25 send a message to the user through display 22 asking if user wants to hold on while this carrier information is consulted at information provider 6, or if user wants to define a carrier. If this last option is selected, a new message asking the user to dial the CIC through keyboard 15 is sent to display 22 and the flow goes to step 30 where micro controllers 17, 23 and 25 will store the new destination in memory 21, so that in the next update call the corresponding table is asked to information provider 6, the flow then goes to step 29. If the user opts waiting until information provider 6 is consulted, the flow goes to step 31 where micro controllers 17, 23 and 25 make an update call to information provider 6, as already discussed, informing the new destination to be recorded for that user and receiving from information provider 6 the user's updated tables, that are stored in memory 21, from there the flow goes to step 28 and remaining operations are performed.

Figure 8:
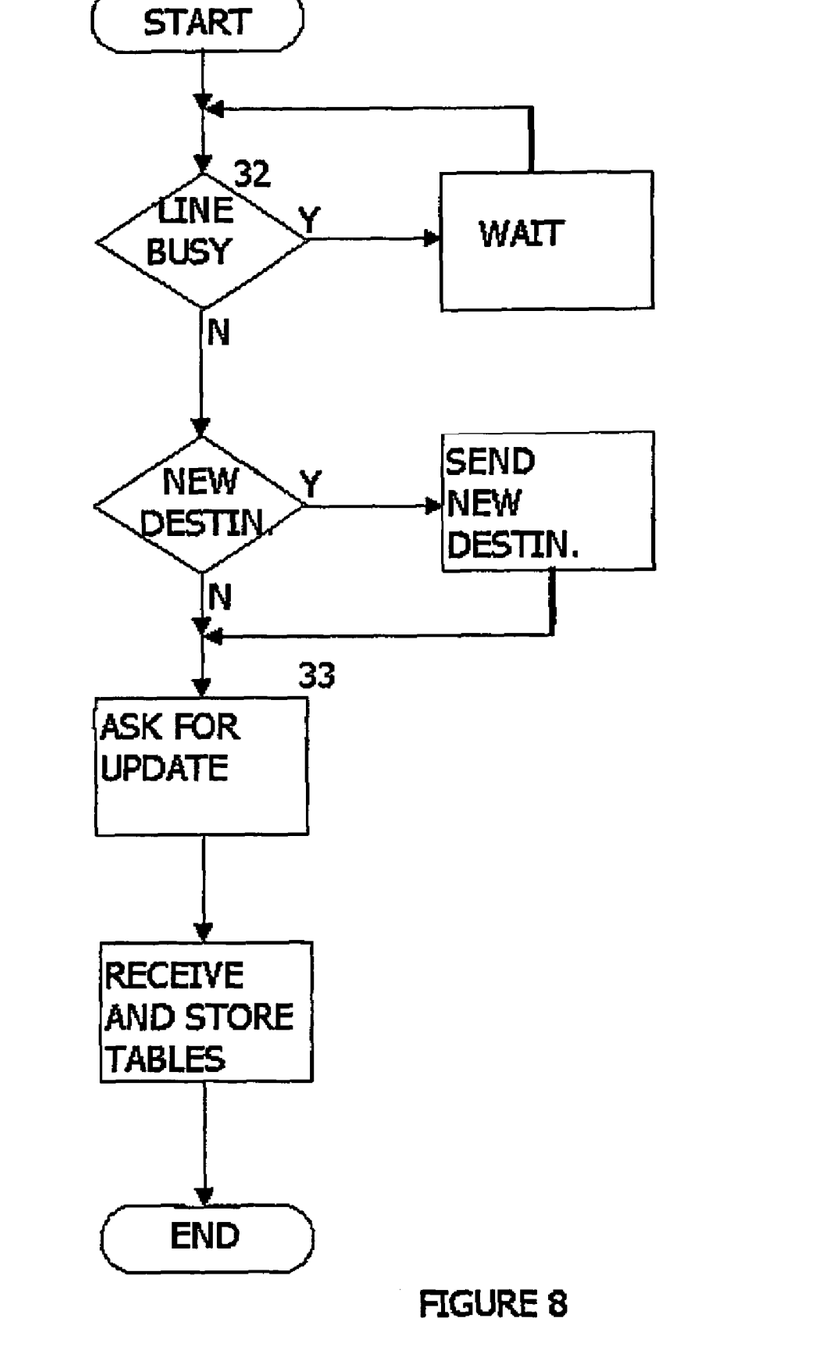
FIG. 8—is a diagram that illustrates the operation of the user's fixed or mobile telephone sets and of the user's interface during the least cost carrier tables updating process, object of this invention.

As can be seen in FIG. 8 the least cost carrier table updating process performed by micro controllers 17, 23 and 25 is illustrated. Updating processes are performed periodically by micro controllers 17, 23 and 25 at intervals defined by information provider 6 and informed during updating process itself. When starting an updating process, micro controllers 17, 23 and 25 first verify in step 32 if the telephone line is busy. If positive a waiting routine is started, when it ends the flow returns to step 32 until the telephone line becomes idle and then the connection to information provider 6 is made, in the sequence, memory 21 is consulted to see if there are new non previously recorded destinations for the user, if positive these destinations are send to information provider 6 for the purpose of creating the corresponding tables and then the flow goes to step 33. If there aren't new destinations to be recorded for the user, the flow goes to step 33 where micro controllers 17, 23 and 25 ask information provider 6 to send user's updated tables, upon reception updated tables are stored in memory 21.

Figure 9:
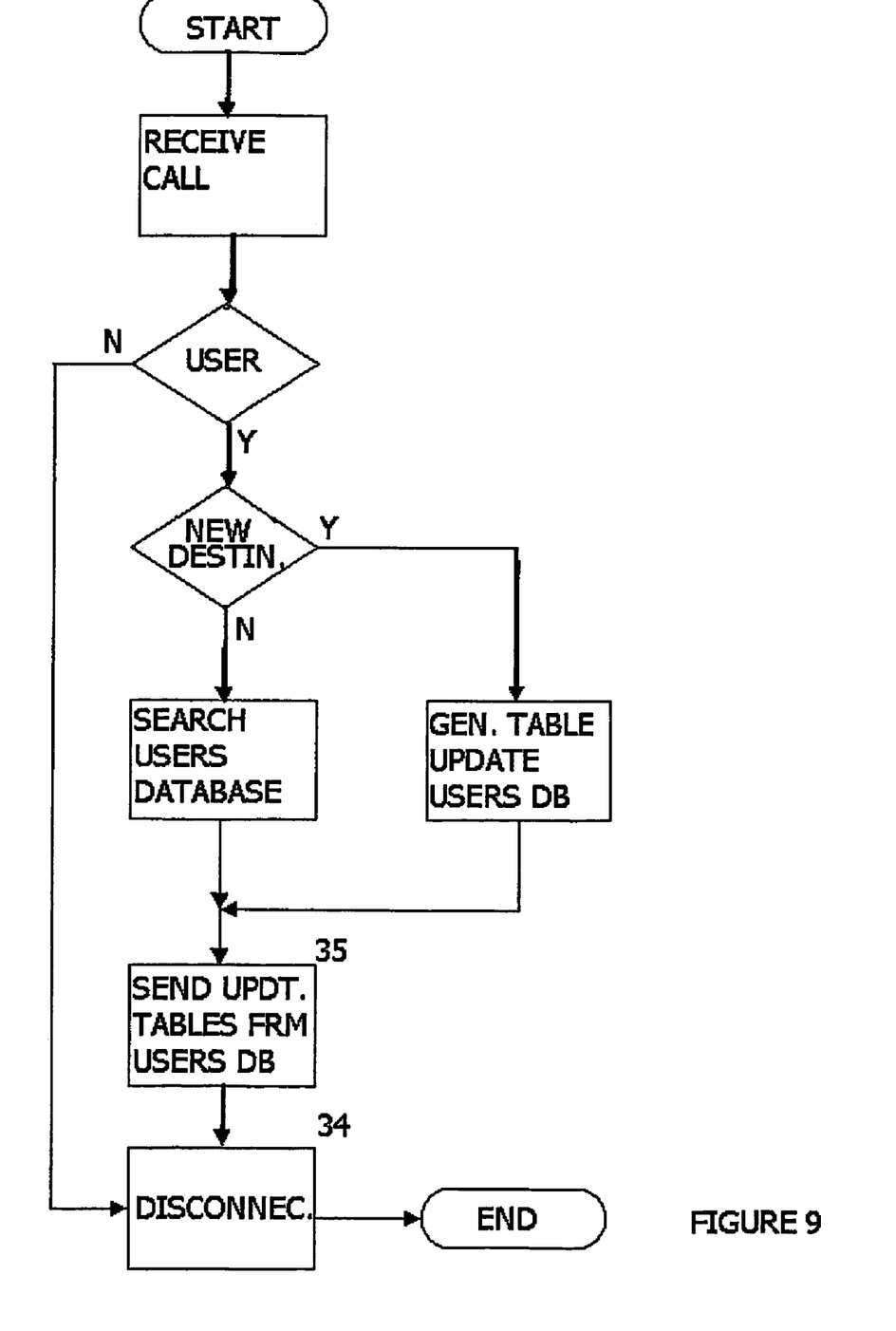
FIG. 9—is a diagram that illustrates the information provider's operation during the process of answering users' updating calls, object of this invention.

According to FIG. 9 an information providers 6 operation during the process of answering updating calls performed by user's telephone set 1 and 8 and by user's interface 3. Upon receiving a call, CPU 11 consults users database 9 to verify if the user is registered, if negative the flow goes to step 34 and the connection is ended. If the user is already registered, CPU 11 verifies if there are new destinations to be recorded for the user, if negative it consults users database 9, retrieves the user's recorded destination tables and in step 35 transmit them through modem 12, upon completion the connection is ended. If there are new destinations to be recorded, CPU 11 consults tariffs database 10 retrieving the tariffs of the carrier companies that offer services for the selected destinations, consults users database 9 recovering user's long distance service preferences and criteria, runs least cost routing algorithms on recovered data and generates tables as the one shown in FIG. 2, that are introduced in users database 9, associated to the user's data and to the corresponding selected destinations, the flow then goes to step 35.

The present invention in what concerns to the user's fixed telephone set 1, is also applicable to wireless telephone sets formed by a portable phone unit and a base unit that communicate by radio frequency with the base unit being connected to the fixed telephone network 5.

Many system and apparatus details were omitted because they are not relevant to characterize the claims of this invention.

Preferred embodiments having been described, it should be understood that the scope of the present invention embraces other possible variations, being limited only by the contents of the accompanying claims, which include the possible equivalents.

The invention claimed is:

1. System for least cost automatic routing of calls in telephone networks with data supplied on demand, the system comprising:

an information provider (6) connected to at least one user apparatus (1, 3, 8) by means of a telephone network (5, 7), the information provider (6) comprising a tariff database (10)

consisting of:
  tariff information for long distance telephone calls,
  a user's database (9) including information allowing to identify the users and
  a central processing unit (11), the system being characterized by:

the user's database (9) containing information that facilitates the creation of a profile for each user regarding the use of the telephone network, such information including destinations of long distance calls, preferred hours for these calls, preferred days for these calls and subscription to carrier's optional calling plans;

the central processing unit (11) being associated to the tariff database (10) and to the user's database (9) for creating tables (36) associated to each long distance call destination, for each user, comprising carrier identification codes (CIC), corresponding to the identification codes of the carriers with the lowest cost for the calls in each day and in each hour to that destination, organized by day of the week and by hour of the day, the tables of carrier identification codes (CIC) for each user being stored in the user's database (9) and updated whenever there is an update in the tariff database (10);

the user apparatus (1, 3, 8) being configured for storing in memory (21) the phone number dialed by the user in a long distance call whenever a table of carrier identification codes (CIC) associated to the destination represented by the number dialed is not found in memory (21); the user apparatus (1, 3, 8) being configured for communicating to the information provider (6), at time intervals defined by the information provider (6), sending the phone numbers for which there are no tables of carrier identification codes (CIC) and receiving the updated tables of carrier identification codes (CIC) existing in the user's database (9) for the user and storing them in memory (21);

the information provider (6) being configured for receiving a communication from the user apparatus (1, 3, 8) and including in the user's database (9), for the particular user, the phone numbers received from the user apparatus (1, 3, 8) for which there are no tables of carrier identification codes (CIC), creating tables of carrier identification codes (CIC) for those numbers, storing these tables in the user's database (9) for the particular user and sending to the user apparatus (1, 3, 8) the tables of carrier identification codes (CIC) stored in the user's database (9) for the particular user; and the user apparatus (1, 3, 8) being configured for analyzing the phone number dialed by the user in a long distance call, searching memory (21) for the existence of a table of carrier identification codes (CIC) associated to the destination represented by that number and if found consulting present date and time and retrieving from memory (21) the carrier identification code (CIC) for that date and time, automatically inserting this code in the appropriate position of the sequence dialed by the user and transmitting the new sequence to the telephone network (5, 7).

2. System for least cost automatic routing of calls in telephone networks with data supplied on demand, the system according to claim 1 being characterized in that optionally comprises at least one user apparatus (3) connected to a telephone (2) or to a PABX (4).

3. A system for least cost automatic routing of calls in telephone networks with data supplied on demand according to claim 1, wherein the at least one user apparatus (1, 3, 8) stores in a memory (21) tables of carrier identification codes (CIC) created by an information provider (6), such tables being associated to the phone numbers dialed by the user that have been previously stored by the at least one user apparatus (1, 3, 8) in memory (21) and transmitted to the information provider (6), such numbers being used by the information provider (6) to create the tables of carrier identification codes (CIC).

4. System for least cost automatic routing of calls in telephone networks with data supplied on demand, particularly used in a system for least cost automatic routing of calls in telephone networks with data supplied on demand according to claims 1 or 3, the system being characterized in that the user apparatus (3) is substituted by hardware and software means implemented internally to the PABX (4).

5. A system for least cost automatic routing of calls in telephone networks with data supplied on demand according to claim 1, wherein the system:
   a) stores and keeps updated information for each user in a user's database (9) that allows the system to compose the user profile with respect to the use of the telephone network;
   b) stores and keeps updated tariff information of all carriers that provide long distance services in the country in a tariff database (10);
   c) stores in a memory (21) of a user apparatus (1, 3, 8) the phone numbers dialed by the user for long distance calls whose destinations are not associated to any table of carrier identification codes (CIC) existing in memory (21);
   d) communicates the user apparatus (1, 3, 8) with an information provider (6) at time intervals defined by the provider;
   e) during the communication, updates the user's database (9) with the numbers that were stored in memory (21) sent by the user apparatus (1, 3, 8), executes algorithms within the information provider (6) that using the user's profile as selection criteria create tables of carrier identification codes (CIC) organized by day of the week and hour of the day for each number received from user apparatus (1, 3, 8), stores these tables in the user's database (9), updates memory (21) with the tables stored in user's database (9) for the particular user sent by the information provider (6);
   f) executes the algorithms for the creation of carrier identification codes (CIC) tables whenever an update occurs in the tariff database (10), storing the new tables in the user's database (9); and
   g) performs in the user apparatus (1, 3, 8) whenever a long distance call is initiated by the user the automatic insertion in the appropriate position of the sequence dialed by the user of the digits from the carrier identification code (CIC) retrieved from memory (21) found in the position corresponding to the present date and time in the table of carrier identification codes (CIC) corresponding to the dialed destination and transmitting the new sequence to the telephone network (5, 7).

* * * * *